US008538428B2

(12) United States Patent
Bartlett et al.

(10) Patent No.: US 8,538,428 B2
(45) Date of Patent: Sep. 17, 2013

(54) RADIO COVERAGE MAPPING FOR TELECOMMUNICATIONS NETWORK

(75) Inventors: Allan Bartlett, Newbury (GB); Dimitrios Stoimenou, Newbury (GB); David Leftley, Newbury (GB)

(73) Assignee: Vodafone IP Licensing Limited, Newbury, Berkshire (GB)

( * ) Notice: Subject to any disclaimer, the term of this patent is extended or adjusted under 35 U.S.C. 154(b) by 139 days.

(21) Appl. No.: 13/101,353

(22) Filed: May 5, 2011

(65) Prior Publication Data
US 2011/0275369 A1 Nov. 10, 2011

(30) Foreign Application Priority Data
May 5, 2010 (GB) .................................. 1007510.9

(51) Int. Cl.
*H04W 4/00* (2009.01)
*H04W 24/00* (2009.01)

(52) U.S. Cl.
USPC ..................... 455/435.2; 455/423; 455/435.1; 455/435.3

(58) Field of Classification Search
USPC ..................... 455/423, 435.1–435.3
See application file for complete search history.

(56) References Cited

U.S. PATENT DOCUMENTS

| 7,158,790 | B1 * | 1/2007 | Elliott | 455/446 |
| 7,340,251 | B1 * | 3/2008 | McClure | 455/434 |
| 8,285,310 | B1 * | 10/2012 | Shrum et al. | 455/457 |
| 2002/0042268 | A1 * | 4/2002 | Cotanis | 455/423 |
| 2002/0111772 | A1 | 8/2002 | Skidmore et al. | 702/186 |
| 2003/0003922 | A1 * | 1/2003 | McClure | 455/456 |
| 2003/0224806 | A1 | 12/2003 | Hebron | 455/457 |
| 2004/0203436 | A1 * | 10/2004 | Oesterling | 455/67.11 |
| 2004/0203718 | A1 * | 10/2004 | Knauerhase et al. | 455/423 |
| 2005/0040968 | A1 * | 2/2005 | Damarla et al. | 340/825.49 |

(Continued)

FOREIGN PATENT DOCUMENTS

| GB | 2333423 | 7/1999 |
| WO | 96/28947 | 9/1996 |
| WO | 2007/103975 | 9/2007 |

OTHER PUBLICATIONS

Extended European Search Report issued on corresponding application No. 11275075.7 dated Aug. 11, 2011(11 pages).

(Continued)

*Primary Examiner* — Nathan Mitchell
(74) *Attorney, Agent, or Firm* — Kratz, Quintos & Hanson, LLP

(57) ABSTRACT

An arrangement for determining radio coverage provided by a telecommunications system to a user of a mobile device is disclosed. In the case of a GSM or UMTS mobile device, if the device is in the idle mode (step A) and if a paging operation is not scheduled (step B), the mobile device records and stores on the mobile device a characteristic of the radio coverage provided when the mobile device is at each of a plurality of locations visited by the user of the mobile device (step C). The arrangement also enables retrieval of the recorded and stored characteristic so that radio coverage provided to the device for the user at the locations can be evaluated. If the telecommunications system includes a plurality of networks, the mobile device will record and store the characteristic for each of the plurality of networks. The arrangement then enables the radio coverage provided by the respective networks to be evaluated, and an informed choice as to the best network for that particular user can be made.

18 Claims, 3 Drawing Sheets

(56) References Cited

U.S. PATENT DOCUMENTS

| | | | |
|---|---|---|---|
| 2005/0192031 A1* | 9/2005 | Vare | 455/456.6 |
| 2005/0213511 A1 | 9/2005 | Reece, Jr. et al. | 370/252 |
| 2005/0250448 A1* | 11/2005 | Knauerhase et al. | 455/41.2 |
| 2006/0128372 A1 | 6/2006 | Gazzola | 455/424 |
| 2006/0246887 A1* | 11/2006 | Barclay et al. | 455/423 |
| 2006/0268711 A1* | 11/2006 | Doradla et al. | 370/235 |
| 2007/0178911 A1* | 8/2007 | Baumeister et al. | 455/456.1 |
| 2007/0213925 A1* | 9/2007 | Sharma et al. | 701/201 |
| 2007/0232345 A1* | 10/2007 | Taoka | 455/522 |
| 2007/0275717 A1* | 11/2007 | Edge et al. | 455/434 |
| 2009/0042557 A1* | 2/2009 | Vardi et al. | 455/422.1 |
| 2009/0191897 A1* | 7/2009 | Johnson et al. | 455/456.3 |
| 2010/0085895 A1* | 4/2010 | Bajko | 370/254 |
| 2010/0191575 A1* | 7/2010 | Raleigh | 705/10 |
| 2011/0130135 A1* | 6/2011 | Trigui | 455/423 |

OTHER PUBLICATIONS

Combined Search and Examination Report issued on corresponding application No. GB1007510.9 from the Intellectual Property Office of Great Britain (8 pages).

* cited by examiner

RADIO COVERAGE MAPPING FOR TELECOMMUNICATIONS NETWORK

FIELD OF THE INVENTION

The present invention relates to a method of determining radio coverage provided by a telecommunications system to a user of a mobile device. The present invention also relates to a device for determining radio coverage provided by a telecommunications system.

More particularly, but not exclusively, the present invention relates to a method of providing subscriber guidance for network service provider selection based on the radio coverage provided by candidate telecommunications systems, actual subscriber usage patterns and available operator tariff structures; and also relates to a device for determining radio coverage provided by a telecommunications system without interfering with the normal subscriber operation and usage of the device.

BACKGROUND TO THE INVENTION

Currently, if a potential user of a mobile network wishes to determine whether that network will provide satisfactory radio coverage for their usage requirements, the user must consult publicly available coverage maps provided by mobile network operators (MNOs), and typically available on MNO websites. The network coverage of the information provided by network operators is typically derived from propagation prediction tools and is often for outdoor service levels. The coverage maps often do not reflect the quality of radio coverage actually available in specific locations and/or in buildings. The lack of granularity and accuracy in publicly available network coverage maps make it difficult for customers to make informed decisions about network choice. Often potential subscribers to a network either have to switch network operators to gain accurate information and real coverage quality or seek anecdotal advice from customers of other networks which may not accurately reflect the performance of their own device or be relevant for the locations frequented by that user.

U.S. Pat. No. 7,392,017 discloses an arrangement for assessing wireless network quality. When a user of a mobile device makes a request for service from an information service provider this request is sent to the information service provider including information about the device and its location (for example using GPS). The arrangement determines network quality by measuring the number of attempts that are required to successfully transmit data between the mobile device and the information service provider. The system does not measure network quality at the mobile device.

U.S. Pat. No. 7,158,790 discloses an arrangement where a mobile device reports signal quality measurements to a network. The network stores the signal quality measurements together with the location of the device (obtained, for example, by GPS). The mobile device generally sends measurements as they are received to the network. However, when the network quality is insufficient to allow the mobile device to transmit the data immediately to the network, the mobile device stores quality and location data. These data are subsequently transmitted to the network when a connection of sufficient quality becomes available. The network analyses the quality and location data provided by many mobile devices to estimate the location of "dead zones" within the network service area.

It would be desirable for a potential customer of a mobile network to accurately determine the radio coverage quality in the important geographical areas specifically for that customer, including deep in-building locations, and preferably from all network operators based on actual radio measurements.

SUMMARY OF THE INVENTION

In one aspect the present invention provides a method of determining radio coverage provided by a telecommunications system to a user of a mobile device, wherein the telecommunications system includes a plurality of networks, the method including operating the mobile device to record and store on the mobile device a characteristic for the plurality of networks of the radio coverage provided when the mobile device is at each of a plurality of locations visited by the user of the mobile device, and enabling retrieval of the recorded characteristic to evaluate the radio coverage provided at the locations by the respective networks to the device for the user.

In the embodiments to be described below, by recording and storing network quality data on the mobile device, and enabling retrieval of the recorded and stored characteristic of the radio coverage to evaluate the radio coverage provided to the device for the user at the locations, the user of the device is able to determine how the telecommunications system will perform for them at the locations that they visit and using their particular device. Compared to known arrangements, the embodiment provides information about the radio coverage of the telecommunications system specific to a particular user and device, and is therefore more accurate than the information that can be provided by the known arrangements. The quality of the radio coverage is not estimated but is measured in each of the relevant locations.

In the embodiment to be described the telecommunications system includes a plurality of networks, and the operating step includes recording and storing the characteristic for each of the plurality of networks. The enabling step then enables the radio coverage provided by the respective networks to be evaluated. For example, the telecommunications system may comprise a plurality of cellular telecommunications networks (PLMNs). Often in a particular geographical area (such as a country) several PLMNs, which are owned by different operators, are potentially available to users. In the embodiment, by enabling the radio coverage provided by each of the respective networks to be evaluated, the user can determine which network provides the best coverage for their particular needs.

The characteristic of radio coverage recorded and stored may be signal strength and/or quality.

The method may include the step of retrieving the characteristic recorded at each of the locations and presenting radio coverage analysis to the user. By such an arrangement the recorded and stored data can be provided to the user in a convenient form that is easily understood—for example as a personalised coverage map.

The method may include retrieving the recorded characteristic of each of the locations and calculating which of the networks provides the best radio coverage for the user at the locations visited by the user.

The mobile device may also be operated to record and store on the mobile device telecommunications services used when the mobile device is at each of the plurality of locations visited by the user of the mobile device. The method may then optionally include calculating the cost of services and recommending a network based on both radio coverage quality and cost. In the embodiment to be described in detail below, a recommendation engine application is implemented on the mobile device which records services used and radio coverage quality. This information and network tariff information is used to calculate a recommendation for the user of the best network according to quality and cost criteria that the user may set. The user is then able to make an informed decision about the choice of network based on coverage quality, usage patterns and tariff structures. This empowers the user to select a network that is best for their particular usage patterns and cost/quality preferences. For example, some users may be willing to make some compromise in network coverage quality if this results in significant cost savings.

The telecommunications system may be a cellular telecommunications system such as a 2G (GSM), 3G (UMTS) or 4G (LTE) telecommunications system. The characteristic of the telecommunications system that is recorded and stored may relate to a cell broadcast channel of the cellular telecommunications system. The mobile device may be operated to store and record the characteristic of the radio coverage while the mobile device is in an idle or inactive communication state, the operating step being interrupted when the mobile device is required to operate in an active communication state, such as when a voice call is made or when user data is sent/received between the mobile device and the network. Preferably, the operation of the mobile device to record the characteristic of radio coverage is scheduled during the idle or inactive communication mode so that it does not interfere with or conflict with paging operations between the telecommunications system and the mobile terminal that also occur during the idle or inactive state. Such paging operations allow the telecommunications system to determine the location of the mobile terminal. By recording the characteristic of the telecommunications system during the idle or inactive communication state, and when paging operations are not being performed, the embodiment provides for recordal of the telecommunications characteristic without interfering with or compromising other tasks normally performed by the mobile terminal. No modification to other elements of the telecommunications system is required for the mobile device to record the characteristic data. Advantageously, the embodiment makes use of the times during which the mobile device is otherwise not performing useful activity to collect information about the telecommunications system for use by the user.

The invention also provides apparatus as defined in the independent claims.

BRIEF DESCRIPTION OF THE DRAWINGS

For a better understanding of the present invention embodiments will now be described by way of example, with reference to the accompanying drawings, in which.

In the drawings like elements are generally designated with the same reference sign.

DETAILED DESCRIPTION OF EMBODIMENT OF THE INVENTION

Figure 1:
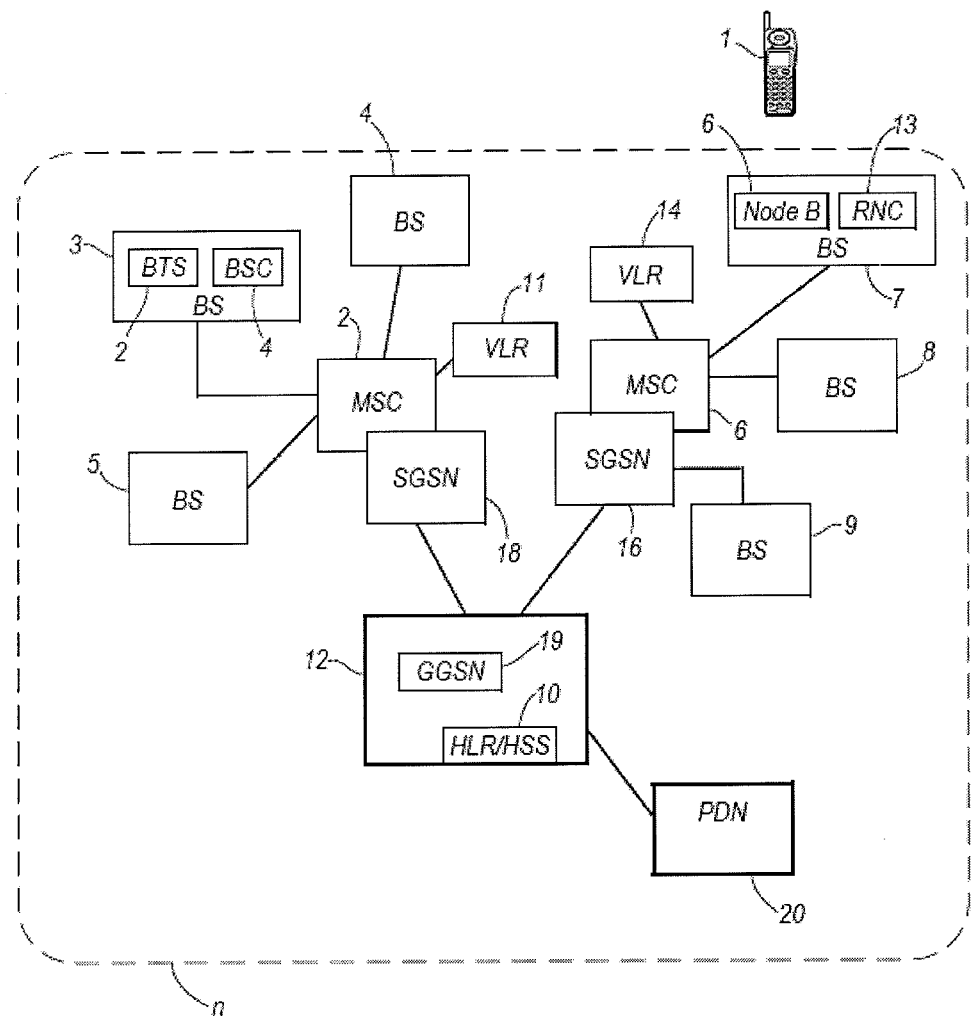
FIG. 1 is a diagrammatic drawing of key elements of a mobile telecommunications network for use in explaining the operation of such a network.

Key elements of a mobile telecommunications network n, and its operation, will now briefly be described with reference to FIG. 1.

Each base station (BS) corresponds to a respective cell of its cellular or mobile telecommunications network and receives calls/data from and transmits calls/data to a mobile terminal in that cell by wireless radio communication in one or both of the circuit switched or packet switched domains. Such a subscriber's mobile terminal (or User Equipment—UE) is shown at 1. The mobile terminal may be a handheld mobile telephone, a personal digital assistant (PDA), a laptop computer equipped with a datacard, or a laptop computer with an embedded chipset containing the UE's functionality.

In a GSM (2G) mobile telecommunications network, each base station subsystem 3 comprises a base transceiver station (BTS) 2 and a base station controller (BSC) 4. A BSC may control more than one BTS. The BTSs and BSCs comprise the radio access network.

In a UMTS (3G) mobile telecommunications network, a radio network controller (RNC) 13 may control more than one node B 6. The node B's and RNC's form base station 7 and comprise the radio access network.

Corresponding elements are provided in an LTE (4G) mobile telecommunications network: The eNodeB of an LTE network replaces the BTS/NodeB and also incorporates the BSC/RNC functionality.

Conventionally, the base stations are arranged in groups and each group of base stations is controlled by one mobile switching centre (MSC), such as MSC 2 for base stations 3,4 and 5, and MSC 6 for base stations 7,8 and 9. In practice, the network will incorporate many more MSCs and base stations than shown in FIG. 1.

Each subscriber to the network is provided with a smart card or SIM which, when associated with the user's mobile terminal, identifies the subscriber to the network. The SIM card is pre-programmed with a unique identification number, the "International Mobile Subscriber Identity" (IMSI) which is not visible on the card and is not known to the subscriber. The subscriber is issued with a publicly known number, that is, the subscriber's telephone number, by means of which calls to the subscriber are initiated by callers. This number is the MSISDN.

The network includes a home location register (HLR)/home subscriber server (HSS) 10 which, for each subscriber to the network, stores the IMSI and the corresponding MSISDN together with other subscriber data, such as the current or last known location of the subscriber's mobile terminal. The HSS is the master database for the network, and while logically it is viewed as one entity, in practice it will be made up of several physical databases. The HSS holds variables and identities for the support, establishment and maintenance of calls and sessions made by subscribers.

When the subscriber wishes to activate their mobile terminal in a network (so that it may make or receive calls subsequently), the subscriber places their SIM card in a card reader associated with the mobile terminal (terminal 1 in this example). The mobile terminal 1 then transmits the IMSI (read from the card) to the base station 7 associated with the particular cell in which the terminal 1 is located. In a traditional network, the base station 7 then transmits this IMSI to the MSC 6 with which the BS 7 is registered. In a network using the functionality described in 3GPP TS 23.236, the base station follows prescribed rules to select which MSC to use, and then transmits this IMSI to the selected MSC.

MSC 6 now accesses the appropriate location in the HLR/HSS 10 present in the network core (CN) 12 and extracts the corresponding subscriber MSISDN and other subscriber data from the appropriate storage location, and stores it temporarily in a location in a visitor location register (VLR) 14. In this way, therefore the particular subscriber is effectively registered with a particular MSC (MSC 6), and the subscriber's information is temporarily stored in the VLR (VLR 14) associated with that MSC.

When the HLR 10 is interrogated by the MSC 6 in the manner described above, the HLR 10 additionally performs an authentication procedure for the mobile terminal 1. The HLR 10 transmits authentication data to the MSC 2 in "challenge" and "response" forms. Using this data, MSC 6 passes a "challenge" to the mobile terminal 1 through base station 7. Upon receipt of this data, the mobile terminal 1 passes this data to its SIM and produces a "response". This response is generated using an encryption algorithm on the SIM and a unique Ki on the SIM. The response is transmitted back to the MSC 6 which checks it against its own information for the subscriber which checks it against information that it has obtained for that subscriber from the HLR 10 in order to complete the authentication process. If the response from the mobile terminal 1 is as expected, the mobile terminal 1 is deemed authenticated. At this point the MSC 6 requests subscription data from the HLR 10. The HLR 10 then passes the subscription data to the VLR 14.

The authentication process will be repeated at regular intervals while the mobile terminal 1 remains activated and can also be repeated each time the mobile terminal makes or receives a call, if required.

Each of the MSCs of the network (MSC 6 and MSC 2) has a respective VLR (14 and 11) associated with it and operates in the same way as already described when a subscriber activates a mobile terminal in one of the cells corresponding to one of the base stations controlled by that MSC.

When the subscriber using mobile terminal 1 wishes to make a call, having already inserted the SIM card into the reader associated with this mobile terminal and the SIM has been authenticated in the manner described, a call may be made by entering the telephone number of the called party in the usual way. This information is received by the base station 7 and passed on to the MSC 6. The MSC 6 routes the calls towards the called party via the MSC 6. By means of the information held in the VLR 14, MSC 6 can associate the call with a particular subscriber and thus record information for charging purposes.

The MSCs 6 and 2 support communications in the circuit switched domain—typically voice calls. Corresponding SGSNs 16 and 18 are provided to support communications in the packet switched domain—such as GPRS data transmissions. The SGSNs 16 and 18 function in an analogous way to the MSCs 6 and 2. The SGSNs 16, 18 are equipped with an equivalent to the VLR for the packet switched domain. GGSN 19 provides IP connectivity for the CN 12, for example to Packet Data Network 20 (such as the Internet).

The network of FIG. 1 includes two Radio Access Technologies (RATs): 2G (GSM) and 3G (UMTS). A telecommunications system may comprise a plurality of telecommunications networks (and each of those networks may include more than one RAT). Each of the networks may be under separate legal ownership. Roaming of user from one network to another network may be allowed in some cases and may be forbidden in other cases.

From the description above, it will be understood that the coverage area of a mobile telecommunications network is divided into a plurality of cells, each of which is served by a respective base station.

Mobile networks such as 2G (GSM) or 3G (UMTS) telecommunications networks have an active state of communication with their mobile terminals and an inactive/idle state of communication with their terminals. When in the active state, as the mobile terminals move between different cells of the network, the communication session is maintained by performing a "handover" operation between the cells. In the inactive/idle state, as a mobile terminal moves between different cells of the network the mobile terminal performs "cell reselection" to select the most appropriate cell on which to "camp" in order that the mobile terminal can be paged by the network when mobile terminating data is destined for that mobile terminal.

Calculations to determine whether to perform a handover from one base station to another base station are performed by the network, whereas calculations whether to perform cell reselection are performed by the mobile terminal.

In a mobile network operating in accordance with the 3G (UMTS) Standards, a mobile terminal device (UE) has a so-called "RRC (Radio Resource Control) state" which depends on its state of activity. In the respective RRC states different functions for mobility are executed. These functions are described in technical specification 3GPP TS 25.304/25.331.

For 2G and 3G, a mobile terminal is in active communication when it has a CS (Circuit Switched) connection established.

In 2.5G, GPRS PS (Packet Switched), active communication can be defined as the GPRS Ready state. In 3G UMTS PS, active communication can be defined as the RRC connected mode state that is CELL_DCH, and thus excluding CELL/URA_PCH RRC connected mode states.

In 3G UMTS PS, CELL/URA_PCH and CELL_FACH can be defined as inactive states. In GPRS, the Standby state can be regarded as an inactive state.

Either one or both of the CS and PS active communications may occur in the mobile terminal.

The RRC states will now briefly be described.

For a 3G mobile terminal, in the active mode the terminal is in the RRC connected mode. The RRC connected mode includes the following states:

CELL_DCH state is characterized by:
  A dedicated physical channel is allocated to the UE in uplink and downlink.
  The UE is known on cell level according to its current active set
  Dedicated transport channels, downlink and uplink transport channels and a combination of these transport channels can be used by the UE.

CELL_FACH state is characterized by:
  No dedicated physical channel is allocated to the UE.
  The UE continuously monitors a FACH (forward access channel) in the downlink.
  The UE is assigned a default common or shared transport channel in the uplink (e.g. RACH) that it can use anytime according to the access procedure for that transport channel.
  The position of the UE is known by UTRAN on cell level according to the cell where the UE last made a cell update.

CELL_PCH state is characterized by:
  No dedicated physical channel is allocated to the UE. The UE selects a PCH (paging channel) with the algorithm, and uses DRX for monitoring the selected PCH via an associated PCH.
  No uplink activity is possible.
  The position of the UE is known by UTRAN on cell level according to the cell where the UE last made a cell update in CELL_FACH state.

URA_PCH state is characterized by:
No dedicated channel is allocated to the UE. The UE selects a PCH, and uses DRX for monitoring the selected PCH via an associated PCH.
No uplink activity is possible.
The location of the UE is known on UTRAN registration area (URA) level according to the URA assigned to the UE during the last URA update in CELL-FACH state.

In the CELL_DCH state a network-driven handover is performed when necessary, as described in 3GPP TS 25-331. In this state a mobile terminal scans the pilot channels of up to 32 intra-frequency cells neighbouring its current cell. The mobile terminal forms a list of the best cells for possible handover based on the received signal strength and/or quality (i.e. the error rate in the received signal). The information in this list is passed to the UTRAN RNC on an event-driven basis, e.g. when the signal strength or signal-to-noise ratio of one of the cells exceeds a threshold. The information list is used by a handover algorithm implemented in the UTRAN RNC. The algorithm that determines when handover occurs is not specified in the GSM or UMTS Standards. The algorithms essentially trigger a handover when the mobile terminal 1 provides a measurement of a neighbour cell received signal at the mobile terminal 1 below a predetermined quality received threshold, which typically has a relation to the quality of the received signal from the serving cell (e.g. better quality by some margin).

In the "CELL_FACH", "CELL_PCH", "URA_PCH" or "idle mode" the mobile terminal controls its own mobility independently and starts a cell switch (reselection) when a neighbouring cell has a better quality than the current cell, as described in 3GPP TS 25.304. A similar procedure is also used in GSM/GPRS mobile networks, as described in technical specification 3GPP TS 05.08 (UE-based cell reselection).

In general, a mobile terminal in "idle mode" states and in RRC connected mode (inactive) states "CELL_FACH", "CELL_PCH" and "URA_PCH" performs periodic measurements of its own as well as of a series of neighbouring cells—typically of the BCCH or other cell broadcast channel transmitted on the RF carrier of each base station. The broadcast control channel (BCCH) is the downlink channel that contains parameters needed by a mobile in order that it can identify the network and gain access to it. Typical information includes the Location Area Code (LAC) and Routing Area Code (RAC), the MNC (Mobile Network Code) and the BA (BCCH Allocation) list. The measurements are not made continuously, as this would be wasteful of battery power. Instead, these measurements are performed at a frequency determined by a Cell Measurement Cycle Length (CMCL). Information about the neighbouring cells is broadcast in the system information block 11 (SIB11) or system information block 12 (SIB12) of the broadcast channel (BCH) as described in 3GPP TS 25.304 and 3GPP TS 25.331.

A switch from the current cell to a neighbouring cell generally takes place in the aforementioned idle/inactive states when a neighbouring cell is technically better than the current cell. It is thus ensured that a mobile terminal is generally located in the cell of a mobile network in which it needs the lowest possible transmitting power in order to contact the closest base station (NodeB) and/or has the best reception conditions.

When a calling party (whether a subscriber within the mobile telecommunications network or outside it) attempts to call a mobile terminal within the network, that mobile terminal must be paged. Paging is a process of broadcasting a message which alerts a specific mobile terminal to take some action—in this example, to notify the terminal that there is an incoming call to be received. If the network knows in which cell the mobile terminal is located, it is only necessary to page in that cell. However, if the mobile terminal is moving within the network (that is, cell reselection has been performed), the precise cell in which the mobile terminal is located may not be known. It will therefore be necessary to perform paging in a number of cells. The greater the number of cells in which paging must occur, the more use of valuable signalling capacity within the network.

However, if the HLR/HSS 10 is to always have an up-to-date record of the cell in which each mobile terminal is located so that the current cell which is occupied by a terminal is always known, this will require a large amount of location updating signalling between the mobile terminal and the HLR/HSS 10 in order that the HLR/HSS 10 has up-to-date records of the cells occupied by each mobile terminal. This is also wasteful of valuable signalling capacity.

As indicated above, the HLR/HSS 10 is updated each time a mobile terminal moves from the coverage area of one MSC to another MSC and from one SGSN to another SGSN. However, typically the area covered by a single MSC and SGSN is large, and to page all the cells covered by a single MSC and SGSN would require a significant amount of paging signalling.

The problems of excessive use of signaling capacity by paging a multiplicity of cells or performing a multiplicity of frequent location updates is solved in a to known manner in 2G and 3G networks by dividing the coverage area of the mobile telecommunications network into a plurality of location areas (LAs) and into a plurality of routing areas (RAs).

A location area relates to a particular geographical area for communications in the circuit-switched domain. Typically, although not necessarily, a location area is larger than the area of a single cell but is smaller than the area covered by one MSC. Each cell within the network broadcasts data indicative of the identity of its location area (LAI). The mobile terminal uses this data to determine when it has moved into a new location area. The terminal stores its last known location area on its SIM. This information stored on the SIM is compared with the location area information broadcast by the local cell. The identities of the two location areas are compared. If they are different, the mobile terminal determines that it has entered a new location area. The mobile terminal then gains access to a radio channel and requests a location area update (LAU). The request includes the now out-of-date LAI. If the MSC/VLR is the same for the new and old location areas, the network can immediately authenticate the mobile terminal and note the change of location area. However, if the mobile terminal is moved to a different MSC/VLR, the MSC/VLR addresses a message to the HSS/HLR. The HSS/HLR notes the new location and downloads security parameters to allow the network to authenticate the mobile. It also passes on subscription details of the user to the new VLR and informs the old VLR to delete its records. The new MSC/VLR allocates a new TMSI to the mobile.

A routeing area relates to a particular geographical area for communications in the packet-switched domain. Typically, although not necessarily, a routeing area is larger than the area of a single cell but is smaller than the area covered by one SGSN. A routeing area is typically, although not necessarily, smaller than a location area. There may be many routeing areas within one location area. Each cell within the network broadcasts data indicative of its routeing area (RAI) in addition to the data mentioned above indicative of the identity of its location area. The mobile terminal uses this received data to determine when it has moved to a new routeing area. The terminal stores the last known routeing area on its SIM. The information stored on the SIM is compared with the routeing area information broadcast by the local cell. The identities of the two routing areas are compared. If they are different, the mobile terminal determines that it has entered a new routeing area. The mobile terminal then gains access to a radio channel and requests a routing area update (RAU). The routeing area is updated in the same manner as the location area, as discussed above.

The mobile terminal listens for pages from the network only periodically—at a frequency defined by the "DRX cycle length".

DRX (discontinuous reception) is a technique that allows the mobile terminal to power down significant amounts of its internal circuitry for a high percentage of the time when it is in the idle or inactive mode while enabling the mobile terminal to be is aware of when page requests for it may be transmitted. The technique works by dividing the mobile terminals within a cell into a set of groups. The group in which a mobile terminal resides is then known locally at both the mobile terminal and the base station. All paging requests to each group are then scheduled and sent at a particular time, which is derived in conjunction with the IMSI of the mobile terminal and some BCCH (Broadcast Control Channel) transmitted data. Thus both the base station and the mobile terminal know when relevant page requests will be sent and the mobile terminal can power down for the period when it knows that page requests will not occur.

In addition to the page requests mentioned above, repeated (or global) paging operations may be performed by the network (typically every two to ten seconds). The mobile terminal is configured to be activated to listen for such repeated (or global) pages at the required time intervals.

Typically a mobile device is associated with a SIM that is issued under the control of a particular PLMN. This PLMN is the "home" network. The user will have a contract with the home network for the provision of telecommunications services. The identity of the PLMN is stored on the SIM.

Conventionally, a mobile device is arranged to retrieve the home PLMN information from the SIM (that is pre-stored on the SIM) and to monitor RF carriers for BCCH for the home network (only). When radio coverage is available from the home network, this allows the mobile device to select the best cell within the home network on which to camp. The home network may comprise a plurality of radio access technologies (such as 2G and 3G). When the network is so arranged, BCCH for all the radio access technologies of the home PLMN will be monitored.

The home network is identified on the SIM and in the BCCH by its mobile network code (MNC). The SIM may also include a list of PLMNs (identified by their MNC) with which the home network has a roaming agreement. Such a roaming agreement allows the user having a contract with the home network to obtain telecommunications services from a visited network when they are roaming in the coverage area of that network. Agreements between the respective networks allow the visited network to be reimbursed by the home network for telecommunications services used by the visiting mobile device. A home network will typically have roaming agreements with networks that cover different geographic areas to the home network, typically networks located in a country different to the country that the home network serves. The SIM may also store a user defined list of networks, i.e. networks that are preferred by the user.

The SIM may also store a list of PLMNs to which the home network forbids access.

Upon power on or after a period where no network coverage is available, the mobile device will select a PLMN. Conventionally, a mobile device will initially try to select the network with which it was last registered, the identity of which is stored on the SIM. Usually, this will be the home network.

To expedite registration on the last selected PLMN, the mobile device uses information that it has stored about the last selected PLMN, such as the carrier frequencies and/or the list of neighbouring cells. On each stored RF carrier frequency, the mobile device searches for the strongest signal cell and reads its system information to verify the PLMN to which the cell belongs. It also reads the system information for PLMN identity, which includes the MMC. The mobile terminal then decides whether the chosen cell is acceptable or whether at least one acceptable cell belonging to the network exists. If an acceptable cell for the PLMN is available, the mobile terminal attempts registration.

If there is no stored last selected network, or if that network is unavailable, the mobile device searches for all other available networks using either the automatic mode or the manual mode, and then selects one of those networks.

In the automatic selection mode all available networks are identified. The mobile device will select a network in the following order:

1. The home network.
2. Each network in a user defined network list stored on the SIM, if present, in order of priority.
3. Each network in a list of networks defined by the home network and stored in the SIM, in order of priority.
4. Other networks, according to a quality criterion, in random order.
5. Other networks that do not fulfil the quality criterion in order of decreasing signal strength/quality.

In the steps above the availability of the networks in each of the available radio access technologies is determined.

The quality criterion referred to in items 4 and 5 above may be the Received Signal strength Code Power (RSCP) being above a particular predetermined value on the Common PIlot CHannel (CPICH). For example, this predetermined value might be greater than or equal to −95 dBm for UMTS and −85 dBm for GSM.

If the mobile device cannot register on any PLMN identified in items 1 to 3 above, it then attempts to register on other PLMNs identified in items 4 and 5 above. If registration on a network is not possible, then an available network is nevertheless selected by the mobile device and only a limited service is available. The mobile device will then enter a "limited service" state in which it is possible to make emergency calls (to designated emergency numbers) only.

The manual selection mode is different in that the mobile device displays all networks that it finds by scanning all frequency carriers. This scanning will identify both allowed and non-allowed networks (non-allowed networks being those on which registration is not possible). All the networks are displayed to the user, and the user makes a manual selection from the networks. The mobile device then attempts registration on the selected network even if that network is not listed as an available network in the SIM. If the user selects an available network in the forbidden network list, generally the network will reject the attempt to register on that network. If an attempt to register on a network is rejected then the network is nevertheless selected by the mobile device and the "limited service" state is entered in which it is possible to make emergency calls (to designated emergency numbers) only.

The procedures mentioned above for selecting a PLMN are described in 3GPP TS 43.022, 25.304 and 45.008, all of which are fully incorporated herein by reference.

From the above discussion it will be understood that mobile terminals operating in accordance with the known Standards are capable of monitoring signal quality/strength data from a plurality of PLMNs.

The embodiment of the present invention advantageously uses this existing functionality to determine the radio coverage provided by one, or more than one, telecommunications network/PLMN.

Figure 2:
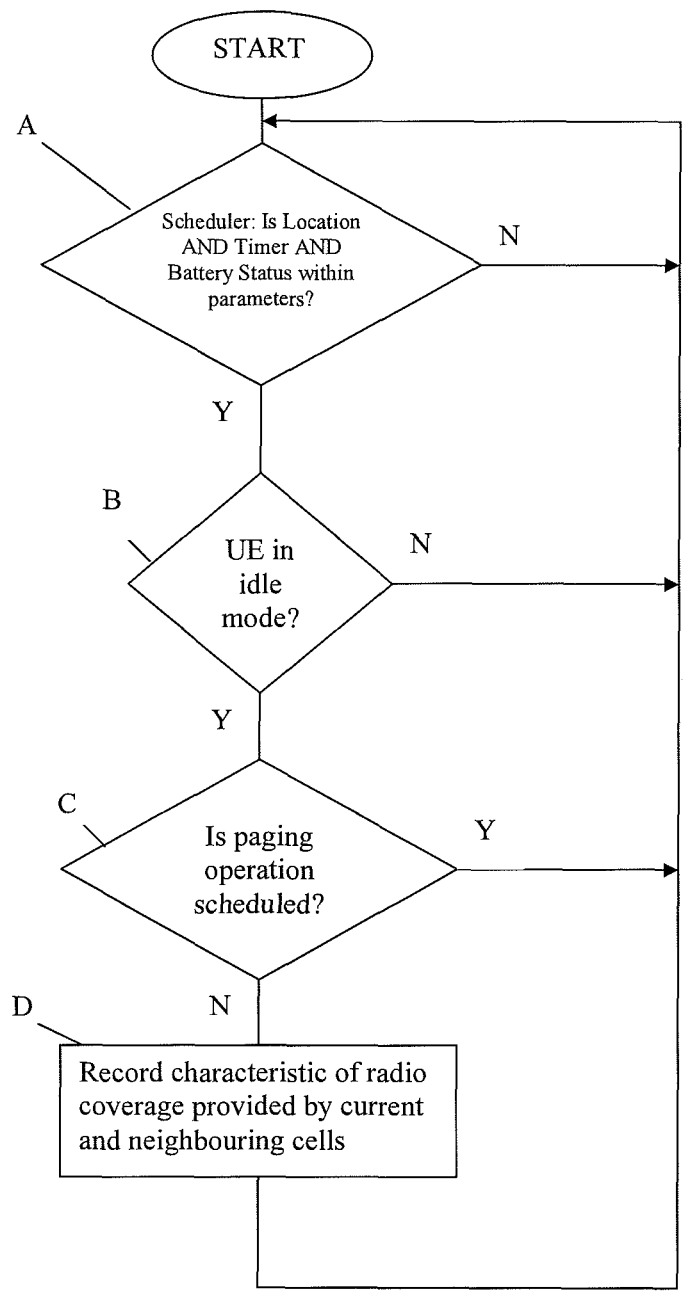
FIG. 2 is a flow chart of the steps performed by a mobile device in accordance with an embodiment of the invention in order to determine the radio coverage provided by a cellular telecommunications system.

FIG. 2 is a flow chart which shows the steps performed to determine the radio coverage provided by a plurality of cellular telecommunications networks/PLMNs. The steps of the flow chart may, for example, be performed by an application that is run by a processor of the mobile device. The application interacts with the firmware of the mobile device and uses the existing capability to measure the radio coverage provided by a plurality of PLMNs—which is described above.

To configure and schedule the execution of the measuring process, a scheduler can be implemented, combining information such as location, time of day and battery status. The user could then simply activate the process and leave it running or choose to customise when the process is run based on a location change event, or time of day. Also the scheduler may take into account the battery status to prevent completely draining the battery.

For example, a user might run the application on their mobile device during a normal day so that the quality of various networks is measured at their home, on their journey to work and on their journey home again.

At step A the scheduler determines the location of the mobile device 1. The location may be provided by GPS, cell triangulation mobile device locating techniques or any other suitable mobile device location technique. It is then determined if the location of the mobile device 1 is within a range set by the user. If the location is not in the range set by the user, the procedure ends (and the process may be restarted after a predetermined time period). The user might set a location range if they are only interested in the coverage in a particular area (for example, an area that they frequent). The user might not be interested in coverage in an area that they visit only once.

At step A the scheduler also determines the current time. The time may be provided by a clock on the mobile device, which is synchronised with the network. It is then determined if the time is within a range set by the user. If the time is not in the range set by the user, the procedure ends (and the process may be restarted after a predetermined time period). The user might set the time range so that measurements are not made during periods that the user will not be moving around—such as when sleeping at home or when at a fixed place of work. Making measurements at these times may not yield any useful information and would waste device battery power.

At step A the scheduler further determines the power supply status of the mobile device. If the device is running on battery power, and the battery is in depleted state (e.g. with less than 20% capacity remaining), the procedure ends (and the process may be restarted after a predetermined time period).

At step B it is determined whether the mobile device is in its idle mode/inactive state or in its active state. In the example of a 3G mobile device, the mobile device will be in an active state if it is in the CELL_DCH state discussed above. Such a terminal will be considered to be in the idle mode or in active state if it is in the CELL_FACH, CELL_PCH or URA_PCH states mentioned above. In different radio access technologies, the definitions of the active and idle/inactive states will be different, but the same principle applies.

If the mobile device is in the active state, the radio coverage measurement procedure is not performed.

If the mobile device is in the idle state/inactive state, it is then determined whether a paging operation of the types discussed above is scheduled at step C. Whether or not a paging operation is scheduled may be determined, for example, with reference to the DRX cycle length value discussed above, or any other suitable mechanism. If a paging operation is scheduled, the radio coverage measuring procedure is not performed.

If a paging operation is not scheduled, then, at step D, the mobile device records a characteristic of the radio coverage provided by the current cell and neighbouring cells of all available PLMNs. It will take coverage measurements and statistically analyse the coverage quality of all the available network operators. The scan will not be limited to the network operator who supplied the operation SIM card in the device. This is achieved through configuring the device to scan and list all alternative operators and poll through them while in idle mode to assess the quality through the signal strength and quality of their cell broadcast channels (e.g. GSM, BCCH). The characteristic for that location is stored in a table in the mobile device. Data indicative of the location is recorded together with the radio coverage characteristic data. The location information may be provided by GPS, cell triangulation mobile device locating techniques or any other suitable mobile device location technique.

After the recording/scanning operation is completed the algorithm returns to step A. Further, during the recording/scanning operation, it is detected whether the user initiates an operation, such as making a voice or data call, which would result in the mobile device leaving the idle mode and entering the active mode. If this occurs, the recording/scanning operation is stopped and the algorithm returns to step A, and the recording/scanning operation is not continued until the mobile device enters the idle mode again.

The application runs autonomously on the mobile device and does not need a continuous network connection to the home PLMN. As indicated above, the application is configurable by the user to adjust the interval between which the characteristic of the radio coverage is recorded. The application may also be configured to record the characteristic of radio coverage when the mobile terminal is at particular geographic locations.

The stored data may be accessed by the user (or another party) to evaluate the radio coverage provided at the locations visited by the user. The data may be presented in various forms. For example, the data may be presented as a table, showing the signal strength measured for each PLMN at a particular time and/or location. Alternatively or additionally, the data may be presented as a map, showing pictorially the signal strength at each location. For example, the signal strength recorded could be indicated by a particular colour or shading.

The radio coverage provided by the different PLMNs may be indicated in separate maps or in a single map, with the radio coverage provided by the respective networks indicated by a different colour or shading. The data may be displayed to the user using the display of the mobile device. Alternatively, the data may be transferred from the mobile device to another device, such as a personal computer to allow analysis of the data by the personal computer and display on the more powerful graphical user interface of the personal computer. The data may be transferred to the personal computer by a wireless connection via the home network or by another wireless connection such as Bluetooth or infra-red, or by a cable connection, for example.

The map may also highlight the location of particular places that are of significance to the user, such as their home, place of work and travelling route to work. This will enable the user to determine in a simple manner whether sufficient radio coverage is available at the places that are important to the user.

The map may allow the user to determine which network provides the best coverage at the places that are significant to the user. A user may select a network which provides high quality coverage at the home and place of work and may be willing to select a network that perhaps does not provide coverage for a small portion of their journey on the way to or from work.

Figure 3:
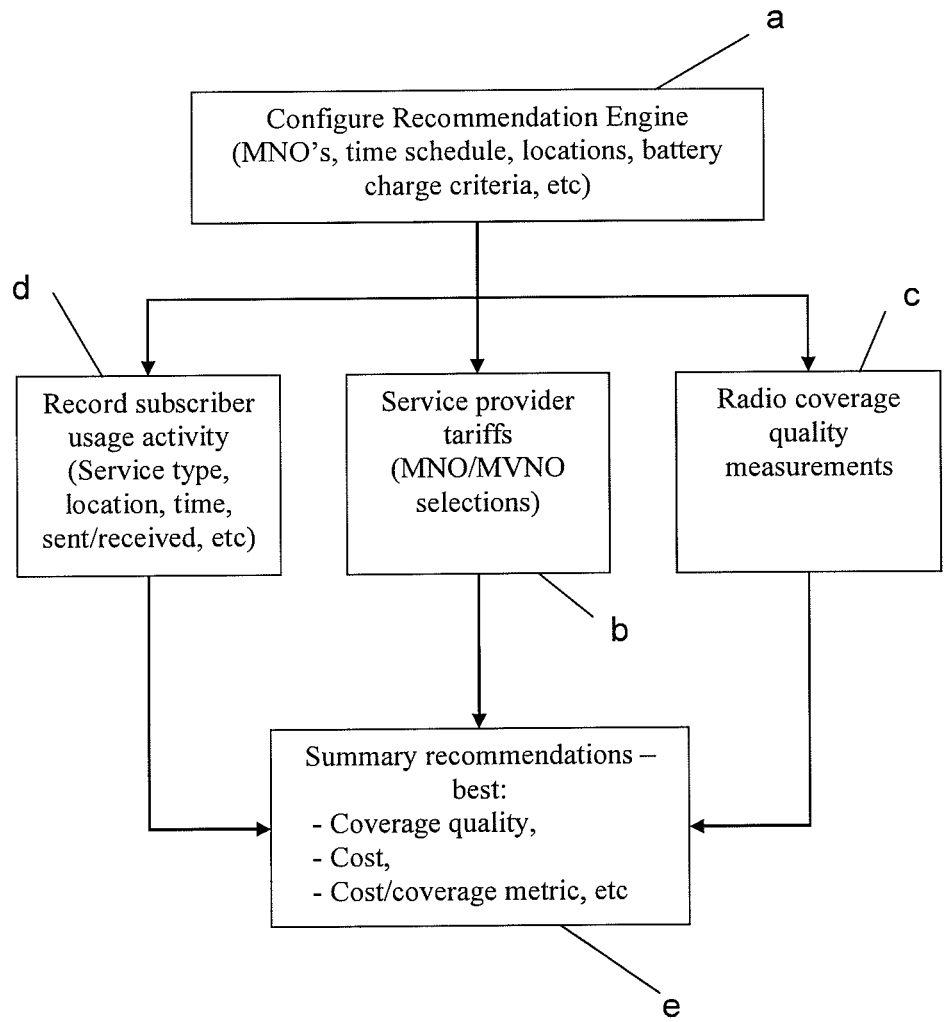
FIG. 3 is an information flow chart, describing the discrete information collections which are combined in order to derive recommendation suggestions to the mobile user.

As an optional enhancement of the embodiment of the invention, the application which performs the steps described above in relation to FIG. 2 may be enhanced to include a subscriber recommendation engine. The functions performed by the subscriber recommendation engine will now be described with reference to the flow chart of FIG. 3.

At step a the recommendation engine is configured. Time periods at which the network characteristics should be measured are set. The locations at which the network characteristic should be measured are set. A battery charge criteria for permitting measurement of the network characteristic are set. These aspects may be set manually by the user or may be configured automatically using data obtained from a remote source that is obtained by the mobile device 1 from the Internet via the network core 12 and the base station of the network with which the mobile device is registered. Alternatively, the settings may be default settings provided by the engine.

In addition to the settings discussed above, particular networks (Mobile Network Operators, MNOs and Mobile Virtual Network Operators, MVNOs) may be specified for which radio quality measurements will be made. Thus, the engine may be configured to exclude from the measurements some networks. This may be advantageous if a user knows that a network cannot not meet their requirements, or if the user has some other reason not to use a particular network.

At step b the engine obtains details of the tariffs of the networks in which the user is interested, as specified in step a. These tariff details may be pre-stored on the mobile device 1, or may be retrieved by the engine from a database via the Internet, network core 12 and the base station of the network with which the mobile device is currently registered. For example, the tariff information may include the cost of a voice call of a predetermined length, the cost of sending an SMS message and the cost of downloading a predetermined amount of data for each of the networks in which the user is interested.

At step c radio coverage quality measurements are made in accordance with the procedure described in relation to FIG. 2. These measurements are made when the time, location and battery criteria specified in step a are satisfied.

At step d during the period that radio coverage quality measurements are made (i.e. when the time, location and battery criteria set in step a are satisfied), the engine records the usage of the mobile device by the user. For example, the type of service used is recorded, such as voice call, SMS transmission or data download. The location at which the service is used is also recorded (which may be particularly useful if a network has differential charging at different locations). The time at which the service is used is also recorded (this can be particularly useful if the network has differential charging at different times of day). The quantity of the service used is also recorded (services such as voice calls are typically measured in terms of seconds, whereas services such as data download are typically measured in terms of data quantity). Typically, these services will always be obtained from a single network—the user's home network.

At step e the engine calculates the recommendations for the user. That is, the engine at step e uses the information captured at steps b, c and d to calculate the best network for the user at the times and locations specified, and for the network specified. This recommendation may be based on the recorded radio coverage quality at the times and locations specified. The engine will determine which network provides the best coverage quality and will recommend that network. Alternatively, at step e, the engine may recommend the network which has the lowest cost for the service types used, as recorded at step d. The engine may consider both radio coverage quality measurements and the cost of the services on each network and make a recommendation based on both quality and cost. The user may specify the relative importance of cost and coverage quality, and the engine may take this into account when making a network recommendation. Although network coverage quality is important to many users, a significant proportion of users may choose a network with slightly lower coverage quality if this results in significant cost savings. The engine may be configured by users to take into account their individual cost/quality preferences when making its recommendations.

The calculations performed by step e of the engine may be performed continuously as the data is gathered in steps b, c and d. Alternatively, the calculations performed at step e may be performed at a particular time, for example when measurement periods specified in step a ends.

It should be understood that steps b, c and d are not necessarily performed in alphabetical order. Steps b, c and d may be performed concurrently.

From the above discussion it will be apparent that the present invention provides a self-contained single user device that measures all the available networks.

In the embodiment described the telecommunications system comprises a plurality of cellular telecommunications networks (PLMNs). The invention is also applicable to a telecommunications system comprising other types of telecommunications networks, such as WiFi and other wireless technologies. The telecommunications system may comprise a plurality of different types of telecommunications networks.

The application run on the mobile terminal described in the embodiment provides a user with a convenient, accurate and personalised assessment of the coverage quality provided by different network operators based on the users particular geographic requirements. Advantageously, the application uses existing hardware capabilities of the mobile device which allow the mobile device to scan all available networks and determine the signal strength/quality thereof.

The invention claimed is:

1. A method of determining radio coverage provided by a telecommunications system and providing coverage information that is specific to a particular user of a particular mobile device, wherein the telecommunications system includes a plurality of networks; the method including:

operating the particular mobile device to record and store on the particular mobile device a characteristic for the plurality of networks of the radio coverage provided when the particular mobile device is at each of a plurality of locations visited by the particular user of the particular mobile device, and enabling retrieval of the recorded characteristic to evaluate the radio coverage provided at the locations by the respective networks to the device for the particular user;

wherein the characteristic is signal strength and/or quality; and wherein the operating step is performed while the particular mobile device is in an idle or inactive communication mode, and wherein the operating step is interrupted when the particular mobile device is required to operate in an active communication mode;

whereby the particular user can determine which of the plurality of networks provides the best coverage for his or her particular needs, and is provided with a personalized assessment of the coverage quality provided by different network operators based on locations that the particular user visits.

2. The method of claim 1, including retrieving the recorded characteristic of each of the locations and presenting a radio coverage analysis to the particular user.

3. The method of claim 1, including retrieving the recorded characteristic of each of the locations and calculating which of the networks provides the best radio coverage for the particular user at the locations visited by the particular user.

4. The method of claim 3, including operating the particular mobile device to record and store telecommunications services used when the particular mobile device is at each of a plurality of locations visited by the particular user of the particular mobile device.

5. The method of claim 4, including calculating the cost of the services, and recommending a network based on both radio coverage quality and cost.

6. The method of claim 1, wherein the telecommunications system is a cellular telecommunications system and the characteristic relates to a cell broadcast channel of the cellular telecommunications system.

7. The method of claim 1, wherein the operating step is scheduled to allow paging to be performed.

8. Apparatus for determining radio coverage provided by a telecommunications system and providing coverage information that is specific to a particular user of a particular mobile device, wherein the telecommunications system includes a plurality of networks; the apparatus including:

a recorder operable to record and store on the particular mobile device a characteristic for the plurality of networks of the radio coverage provided when the particular mobile device is at each of a plurality of locations visited by the particular user of the particular mobile device, and an evaluator operable to retrieve the recorded characteristic to enable evaluation of the radio coverage provided at the locations by the respective networks to the device for the particular user;

wherein the recorder is operable to record the characteristic of signal strength and/or quality; and wherein the recorder is configured to record the characteristic while the particular mobile device is in an idle or inactive communication mode, and not record when the particular mobile device is in an active communication mode;

whereby the particular user can determine which of the plurality of networks provides the best coverage for his or her particular needs, and is provided with a personalized assessment of the coverage quality provided by different network operators based on locations that the particular user visits.

9. The apparatus of claim 8, including a retriever the recorded characteristic of each of the locations and to a present radio coverage analysis to the particular user.

10. The apparatus of claim 8, including a calculator to calculate which of the networks provides the best radio coverage for the particular user at the locations visited by the particular user.

11. The apparatus of claim 10, wherein the recorder is operable to record and store telecommunications services used when the particular mobile device is at each of a plurality of locations visited by the particular user of the particular mobile device.

12. The apparatus of claims 11, including a calculator to calculate the cost of the services, and to recommend a network based on both radio coverage quality and cost.

13. The apparatus of claim 8, wherein the telecommunications system is a cellular telecommunications system and the characteristic relates to a cell is broadcast channel of the cellular telecommunications system.

14. The apparatus of claim 8, wherein the recorder includes a scheduler to record the characteristic according to a schedule so as to allow paging of the device to be performed.

15. The method of claim 1, wherein the method includes determining the radio coverage provided by the telecommunications system specifically for the particular user of the mobile device.

16. The apparatus of claim 8, wherein the apparatus determines the radio coverage provided by the telecommunications system specifically for the particular user of the mobile device.

17. The method of claim 1, wherein the method includes generating a personalized coverage map that highlights the location of particular places that are of significance to the particular user.

18. The apparatus of claim 8, wherein the recorder generates a personalized coverage map that highlights the location of particular places that are of significance to the particular user.

* * * * *